United States Patent [19]

Sotomura

[11] Patent Number: 5,188,768

[45] Date of Patent: Feb. 23, 1993

[54] SOLID FORM ELECTROLYTE COMPOSITES

[75] Inventor: Tadashi Sotomura, Kashiwara, Japan

[73] Assignee: Matsushita Electric Industrial Co., Ltd., Osaka, Japan

[21] Appl. No.: 706,988

[22] Filed: May 29, 1991

[30] Foreign Application Priority Data

May 30, 1990 [JP] Japan .................................. 2-140934
May 30, 1990 [JP] Japan .................................. 2-140935
May 30, 1990 [JP] Japan .................................. 2-140936
May 30, 1990 [JP] Japan .................................. 2-140937

[51] Int. Cl.$^5$ .......................... H01B 1/00; H01B 1/06; H01M 4/88
[52] U.S. Cl. ................................. 252/518; 252/500; 252/182.1; 252/62.2; 429/191; 429/213
[58] Field of Search ...................... 252/500, 519, 62.2, 252/182.1, 518, 520, 521; 429/191, 213

[56] References Cited

U.S. PATENT DOCUMENTS

| | | | |
|---|---|---|---|
| 4,215,917 | 8/1980 | Giglin et al. | 350/357 |
| 4,526,855 | 7/1985 | Hartwig et al. | 429/191 |
| 4,620,944 | 11/1986 | Armand et al. | 252/518 |
| 4,769,115 | 9/1988 | Satoh et al. | 204/59 R |
| 4,858,078 | 8/1989 | Morimoto et al. | 361/527 |
| 4,978,473 | 12/1990 | Kuroda et al. | 252/500 |

*Primary Examiner*—Mark L. Bell
*Assistant Examiner*—Michael A. Marcheschi
*Attorney, Agent, or Firm*—Ratner & Prestia

[57] ABSTRACT

This invention relates to solid form electrolyte composites of high uniformity, moldability and ion conductivity, to be employed extensively to fabricate various solid electrochemical devices such as batteries, capacitors, sensors, display devices, recording devices, etc. Said solid electrolyte composites of the invention consist mainly of an ion-exchanging layered compound, an ionic material expressed by Formula MX wherein M is either a metal ion, proton, or an ammonium ion, and X is an anion of strong acid, and one of the compounds specified by (a) to (d), where (a) is a cationic surface active agent having either an ethyleneoxide chain or a propyleneoxide chain, (b) is a cationic surface active agent having an ethylene-oxide chain and a butyleneoxide chain, (c) is a polyether compound derived by adding ethylene oxide or propylene-oxide to a polyamine compound, and (d) is a polyether compound derived by adding ethylene oxide, and butylene oxide to an polyamine compound.

4 Claims, No Drawings

SOLID FORM ELECTROLYTE COMPOSITES

BACKGROUND OF THE INVENTION

1. Field of Industrial Application

This invention relates to solid form electrolyte composites employed to fabricate various solid electrochemical products such as batteries, capacitors, sensors, display devices, recording devices, etc.

2. Prior Art

It had been known that various electrochemical devices such as compact and thin batteries, double layered electrical capacitors, etc., can be constructed without leakage of liquid electrolyte by employing a solid electrolyte. However, since such solid electrolytes lack mechanical elasticity, they are brittle or highly vulnerable against even a slight mechanical shock.

In order to solve such problem, various methods had been proposed. Among these, Japanese Laid-Open Patent 5h0 63-245871 discloses a method to produce electrochemical devices of high mechanical strength against shock by preparing a composite of ionic inorganic compound and elastomer, and a report "Fast Ion Transport in Solid" (by P. Vanishsta et al., Eds. P. 131 (1979) North Holand Publishing Co.) discloses a solid polymer electrolyte comprised of polyethylene-oxide (PEO) and alkaline metallic salt.

However, because of the poor chemical stability of such ion-conductive inorganic compounds, handling those compounds is a highly difficult matter in general. Among these, alkal metal ion conductors are particularly difficult to handle because of their chemical instability and their tendency to react with radicals such as active hydrogen atoms retained in an elastomer when such an ionic conductor is composited with such an elastomer, or with minute amounts of water or oxygen atoms contained in the handling environment.

On the other hand, solid polymer electrolytes are considered more advantageous than inorganic solid electrolytes because of their lighter weight, higher flexibility and moldability. However, solid polymer electrolytes are difficult to form into a uniform film, and attempts to improve their uniformity and film moldability resulted in a sacrifice of the ion conductivity of these compositions.

SUMMARY OF THE INVENTION

The present invention has been accomplished through an extensive study by the inventors to obtain new uniform solid form electrolyte composites having higher ionic conductivities and improved moldability.

The solid electrolyte composites of this invention consist mainly of an ion-exchanging layered compound, an ionic material expressed as MX (wherein M is either a metal ion, proton, or ammonium ion, and X is an anion of strong acid), and one of the compounds (a) to (d) shown below, where (a) is a cationic surface active agent having either an ethylene-oxide (sometimes hereafter "EO") chain or a propylene-oxide (sometimes hereafter "PO") chain, (b) is a cationic surface active agent having an ethylene-oxide chain and a butylene-oxide (sometimes hereafter abbreviated "BO") chain, (c) is a polyether compound derived by adding EO or PO to a polyamine compound, (d) is a polyether compound derived by adding EO and BO to an polyamine compound.

The resultant solid form electrolyte constitutes a composite made of an ionic compound MX, either cationic surface active agent or polyether compound, and an ion exchanging layered compound. The ion conductivity of this composite is realized by high-density and ion-conductive passages existing either in the interlayers or at the surface of said layered compound crystal.

The purpose of the cationic surface active agent or polyether compound employed to prepare said solid form electrolyte is to make the mixing of said ion-exchanging layered compound and a solvent easier, and to promote the formation of uniform ion-conductive passages. Furthermore, the addition of an ion-conductive powder to the solid form electrolyte increases its ion-conductivity and is highly effective both to prevent possible coagulation of said ion-conductive powder and to promote uniform mixing of a solvent with the ion exchanging layered compound.

Thus, high ionic conductivity and uniformity in addition to high moldability and mechanical strength of a solid form electrolyte can be realized by the interaction between a cationic surface active agent or an EO chain-substituted polyether compound, polyethylene-oxide chains, and the micro-porous structure of an ion-exchanging layered compound.

EMBODIMENTS OF THE INVENTION

Certain embodiments of the solid form electrolytes of the present invention will now be described. However, this does not necessarily mean that the present invention is limited within the scope of these embodiments. Moreover, unless otherwise specified, the part and % and ratio shown in the description of these embodiments refers in all cases to weight part, weight % and a weight ratio unless otherwise indicated.

The cationic surface active agent, having at least either EO or PO chains, used in the solid form electrolyte of the present invention in the embodiments of the invention described below can be expressed by the following Formulas (1) or (2).

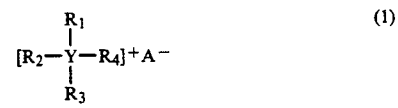

$$[R_2-Y-R_4]^+ A^- \quad (1)$$
with $R_1$ above and $R_3$ below Y

$$[R_2-Z]^+ A^- \quad (2)$$
with $R_1$ above and $R_3$ below Z wherein Y is a nitrogen or phosphorous atom, Z is a sulfur atom, $A^-$ is any one of $Cl^-$, $Br^-$, $I^-$, $F^-$, $ClO_4^-$, $CH_3COO^-$, $CF_3SO_3^-$, $OH^-$, $CH_3SO_3^-$, $AlCl_4^-$, $BF_4^-$, $PF_6^-$ and $NO_2^-$, or a combination of these, $R_1$, $R_2$, $R_3$, and $R_4$ are hydrocarbon groups, and at least one of these is a hydrocarbon group of which carbon number is in a range from one to 30, having or not having as a substituent group either an EO or PO chain, and the rest are hydrocarbon groups of which carbon numbers are in a range from one to 30, and also having or not having an EO or PO substituent group.

Preferably, the units of EO or PO in the EO or PO chain substituents, per mole cationic surface active agent, is in a range from 20 to 500. The desirable amount of said cationic surface active agent additive in this case is in a range from 0.5 to 20%.

As a cationic surface active agent having EO and BO chains, those shown by Formulas (3) or (4) can be used.

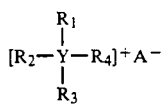

$$[R_2-Y-R_4]^+ A^- \quad (3)$$
with substituents $R_1$, $R_3$ on Y

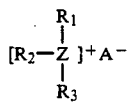

$$[R_2-Z\ ]^+ A^- \quad (4)$$
with substituents $R_1$, $R_3$ on Z wherein Y is a nitrogen or phosphorous atom, Z is a sulfur atom, $A^-$ is any one of $Cl^-$, $Br^-$, $I^-$, $F^-$, $ClO_4$, $CH_3COO^-$, $CF_3SO_3^-$, $OH^-$, $CH_3SO_3^-$, $AlCl_4^-$, $BF_4^-$, $PF_6^-$ and $NO_2^-$, or a combination of these, $R_1$, $R_2$, $R_3$, and $R_4$ are hydrocarbon groups, at least one of which is a hydrocarbon group having a carbon number in the range from 1 to 30, having or not having a substituent group having EO and BO chains, and the rest are hydrocarbon groups having carbon numbers in a range from 1 to 30, and having or not having an EO and BO substituent group.

The prefered ratio of EO and BO chain units in this case is in the range from 20 to 500. The desirable amount of said cationic surface active agent additive in this case is in a range from 0.5 to 20%.

The polyether compound useful in this invention is attainable by reacting either EO or PO with a polyamine compound and is obtained by reacting a polyamide compound with either of EO or PO at a temperature of 100° to 180° C. and a pressure of 1 to 10 atm. As a polyamine compound, polyethylene-imine, polyalkylenepolyamines, or their derivative can be used.

As a polyalkylene-polyamine, any one of diethylenetriamine, triethylene-tetraamine, hexamethylene-tetraamine, or dipropylene-triamine can be used. The added molar number of EO and BO units is two to 150 units per activated hydrogen of polyamine compound. The ratio of added EO over BO (EO to BO), or EO/BO is conventionally in a range between 80/20 to 10/90, and the average molecular weight of the polyether is in a range between 1000 to five million molecular weight.

Although no limitation is provided for the ionic material MX, any soluble salt such as LiI, LiClO_4, LiCF_3SO_3, LiBF_6, LiBF_4, LiSCN, LiAsF_6, NaI, NaSCN, NaBr, KI, AgNO_3, CuCl_2, Mg(ClO_4)_2 and AlCl_3 can be used.

As an ion-exchanging layered compound, the following can be used: a clay material such as silicates including montmorillonite, hectolite, saponite, and smectite; a phosphate such as zirconium phosphate and titanium phosphate; a metallic acid such as vanadic acid, antimonic acid, tungstic acid.

An ion-conductive powder can be added to said solid form electrolyte of the invention if necessary. This ion-conductive powder can be a copper-ion conductive solid electrolyte including $MeCu_4I_{2-x}Cl_{3+x}$ (x can takes a value from 0.25-1.0, and Me can be any of Rb, K, or NH_4 or a mixture thereof) and $CuI-Cu_2O-MoO_3$ system glass, a silver ion conductive solid electrolyte including $RbAg_4I_5$, $Ag_3Si$, and $AgI-Ag_2O-MoO_3$ system glass, a lithium ion conductive solid electrolyte including $Ag_6I_4WO_4$, LiI, $LiI.H_2O$, $Li$-$\beta$-$Al_2O_3$, LiI-$Li_2S$-$B_2S_3$, and $PEO$-$LiCF_3SO_3$, or a proton conductive solid electrolyte such as $H_3Mo_{12}PO_{40}.29H_2O$, or $H_3W_{12}PO_{40}.29H_2O$.

The average particle size of these additives can be from less than one micron to several tens of microns, and there is no limitation to the amount of these additive particles so far as the moldability of the composite is unaffected.

One of the solid form electrolytes of the invention is prepared as follows: A powder of an ion exchanging layered compound is added in an amount of 1 to 50% to a solvent in which an ionic compound is dissolved also in an amount of 1 to 50%, to prepare a slurry. A cationic surface active agent or polyether compound is added to said slurry in an amount of 1 to 20%, and this is pulverized and mixed by using a pulverizing device to obtain an electrolyte slurry having a solid content of 5 to 95%.

In the next step, this slurry is molded as it is, or coated on a supporting plate such as a teflon plate or nylon mesh, and dried to obtain a solid form electrolyte. When a mesh-form supporting plate is used, the resultant molded product can be used as a solid form electrolyte leaving the nylon mesh inside.

These processes are, if necessary, conducted in a dry atmosphere with a relative humidity less than 40%. As the solvent, any of the following may be used: a ketone, such as acetone, methyl-ethyl-ketone, and methyl-isobutyl-ketone, a saturated hydrocarbon solvent such as n-hexane, n-heptane, n-octane, and cyclohexane, an aromatic solvent such as benzene, toluene and xylene, an ester solvent such as ethyl acetate, butyl acetate, and propylene carbonate, an alcohol solvent including ethanol, methanol, isopropyl-alcohol, ethylene glycol, glycerine, and polyethylene-glycol, a nitryl, such as acetonitryl, or water.

EXAMPLE 1

A cationic surface active agent, expressed below as Formula (5), is dissolved in acetonitrile solvent to prepare a 20% solution of said cationic surface active agent (A) to which LiCF_3SO_3 as an ionic material is added in an amount to produce a 10% solution thereof. Then, γ-zirconium phosphate powder, of which the average particle size is 25 μm, is added to said solution of cation surface active agent (A) to produce a solid content of 30% and this combination of materials is mixed at 40° C. for 24 hours.

Then, the resultant electrolyte slurry is coated on a smooth surface of a teflon plate by using a doctor blade, and is dried for one hour in a dried argon atmosphere heated to 130° C., and is dried further in vacuum for another 5 hours to yield a lithium-ion conductive solid electrolyte sheet having a thickness of 80 μm and an area of 80×80 mm².

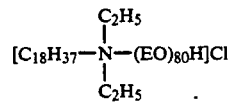

$$[C_{18}H_{37}-\underset{\underset{C_2H_5}{|}}{\overset{\overset{C_2H_5}{|}}{N}}-(EO)_{80}H]Cl \quad (5)$$

EXAMPLE 2

A cationic surface active agent, expressed below as Formula (6) is dissolved in a propylenecarbonate solvent to prepare a 10% solution of said cationic surface active agent (B) to which LiClO_4, as an ionic material, is added in an amount to form a 10% solution thereof. Then, montmorillonite powder having an average particle size of 15 μm, is added to said solution of cation surface active agent (B) in an amount to produce a solid content of 20%. This combination of material is mixed at 40° C. for 24 hours.

The resultant electrolyte slurry is coated on a 330 mesh polyester mesh with 40% opening area and placed on a smooth surface of a teflon plate. The product is then dried in a dried argon atmosphere kept at 130° C. for one hour, and is dried further in vacuum for another 5 hours to yield a lithium-ion conductive solid form electrolyte sheet (B1) having a thickness of 120 μm and an area of 80×80 mm².

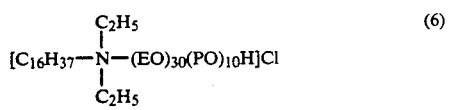
(6)

EXAMPLE 3

A cationic surface active agent, expressed below as Formula (7) is dissolved in ion-exchanged water to prepare a 10% solution of said cationic surface active agent (C) to which LiClO₄ as an ionic material is added in an amount to produce a 20% solution thereof.

Then, γ-zirconium phosphate powder of which the average particle size is 25 μm, is added to said solution of cation surface active agent (C) in an amount to produce a solid content of 20%, and this combination of materials is mixed at 40° C. for 2 hours.

The resultant electrolyte slurry is coated on a 330 mesh polyester mesh with 40% opening area. This coated mesh is placed on a smooth surface of a teflon plate, and is dried in air at 80° C. and is left in air for 24 hours to yield a lithium-ion and probably proton conductive solid electrolyte sheet (C1) having a thickness of 130 μm and an area of 80×80 mm².

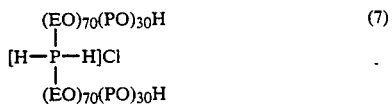
(7)

EXAMPLE 4

A cationic surface active agent, expressed below as Formula (8), is dissolved in ion-exchanged water to prepare a 10% solution of said cationic surface active agent (D), to which AlCl₃ as an ionic material is added in an amount to produce a 20% solution thereof. Then, montmorillorite powder, of which the average particle size is 15 μm, is added to said solution (B) in an amount to produce for a solid content of 20%. This combination of materials is mixed at 40° C. for 24 hours.

The resultant electrolyte slurry is coated on a 330 mesh polyester mesh with 40% opening area and is placed on a smooth surface of a silicone resin plate, and is dried in air kept at 80° C. for one hour, and is left in air for 24 hours to yield a solid electrolyte sheet (D1) having a thickness of 120 μm and an area of 80×80 mm². In this molded product, the ions which contribute to conduction are probably both the aluminum ion and the proton.

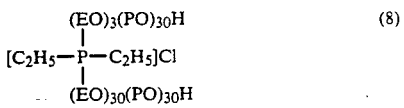
(8)

EXAMPLE 5

An inorganic solid electrolyte, Li-β-Al₂O₃ powder of which the average particle size is 5 μm, is added in an amount to produce a 20 weight % slurry thereof, the slurry being that obtained by using the process described in Example 1.

The resultant electrolyte slurry is coated on a smooth surface of a teflon plate by using a doctor blade, and is dried in a dried argon atmosphere kept at 80° C. for one hour, and is dried in vacuum for another 5 hours to yield a sheet-formed lithium-ion conductive solid electrolyte molded product (E1) having a thickness of 55 μm and an area of 80×80 mm².

EXAMPLE 6

A cationic surface active agent, expressed below as Formula (9) is dissolved into acetonitrile to prepare a 10% solution of said cationic surface active agent (F); to this solution LiCF₃SO₃, as an ionic material, is added in an amount to produce a 10% solution thereof. Then, γ-zirconium phosphate powder, of which the average particle size is 25 μm, is added to said solution of cation surface active agent (F) in an amount to produce a solid content of 30%. This combination of materials is mixed at 40° C. for 24 hours.

The resultant electrolyte slurry is coated on a smooth surface of a teflon plate by using a doctor blade, and is dried in a dried argon atmosphere kept at 130° C. for one hour, and is further dried in vacuum for another 5 hours to yield a lithium-ion conductive solid electrolyte sheet (F1) having a thickness of 85 μm and an area of 80×80 mm².

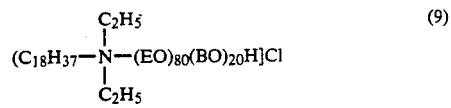
(9)

EXAMPLE 7

A cationic surface active agent, expressed below as Formula (10) is dissolved into propylene carbonate to prepare a 10% solution of said cationic surface active agent (G); to this solution LiClO₄, as an ionic material, is added 10% solution thereof. Then, montmorillorite powder, whose average particle size is 15 μm, is added to said solution of cation surface active agent (G) in an amount to produce a solid content of 20%. This combination of materials is mixed at 40° C. for 24 hours.

The resultant electrolyte slurry is coated on a 330 mesh polyester mesh with 40% opening area and this is placed on a smooth surface of a teflon plate, and dried in a dried argon atmosphere kept at 130° C. for one hour, and is further dried in vacuum for 5 hours to yield a lithium-ion conductive solid electrolyte sheet (G1) having a thickness of 130 μm and an area of 80×80 mm².

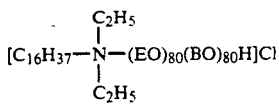

EXAMPLE 8

A cationic surface active agent, expressed, below as Formula (11), is dissolved in ion-exchanged water to prepare a 10% solution of said cationic surface active agent (H); to this solution LiClO$_4$, as an ionic material, is added in an amount to produce a 10% solution thereof. Then, γ-zirconium phosphate powder of which the average particle size is 25 μm, is added to said solution of cation surface active agent in an amount to produce(H) a solid content of 20%. This combination of materials is mixed at 40° C. for 24 hours.

The resultant electrolyte slurry is coated on a 330 mesh polyester mesh with 40% opening area placed on a smooth surface of a teflon plate, dried at 80° C. for one hour, and further dried in air for 24 hours to yield a conductive solid electrolyte sheet (HI) having a thickness of 120 μm and an area of 80×80 mm$^2$. In this molded product, the ions which contribute to conduction are probably both lithium ion and proton.

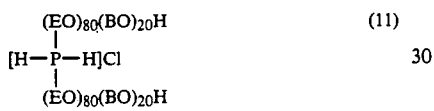

EXAMPLE 9

A cationic surface active agent, expressed below as Formula (12), is dissolved in ion-exchanged water to prepare a 10% solution of said cationic surface active agent (I); to this solution AlCl$_3$, as an ionic material, is added in an amount of 20% of said solution. Then, montmorillorite powder, of which the average particle size is 15 μm, is added to said solution of cation surface active agent (I) is amount to produce a solid content of 20%. This combination of materials is mixed at 40° C. for 24 hours.

The resultant electrolyte slurry is coated on a 330 mesh polyester mesh having a thickness of 85 μm and an aperture factor, or opening area of 40% and this coated mesh is then placed on a silicone resin plate, and is dried at 80° C. for one hour, and is further dried in air for 24 hours to yield a conductive solid electrolyte sheet (I1) having a thickness of 120 μm and an area of 80×80 mm$^2$. In this molded product, the ions which contribute to conduction are probably both the aluminum ion and the proton.

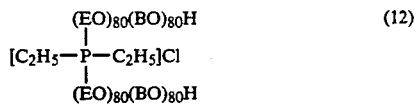

EXAMPLE 10

An inorganic solid electrolyte, Li-β-Al$_2$O$_3$ powder, with 5 μm average particle size, is added to a slurry in an amount of 20 weight % of the slurry, the slurry being that obtained by using the same process described in Example 6.

The resultant electrolyte slurry is coated on a smooth surface of a teflon plate by using a doctor blade, and is dried in a dried argon atmosphere kept at 80° C. for one hour, and is further dried in vacuum for another 5 hours to yield a sheet-formed lithium-ion conductive solid electrolyte molded product (J1) having a thickness of 65 μm and an area of 80×80 mm$^2$.

EXAMPLE 11

A polyether compound of which the molecular weight is 180,000, and which is obtained by adding EO and PO (at an EO/PO ratio of 37/70) to polyethyleneimine containing 10 nitrogen atoms per molecule is dissolved in acetonitrile to obtain a 20% polyether solution (K); to this solution LiCF$_3$SO$_3$, as an ionic material, is further dissolved, in an amount to produce a 10% solution thereof.

Then, γ-zirconium phosphate powder, with 25 μm average particle size, is added to said solution (H) in an amount to produce a solid content of 20%. This combination of materials is mixed at 40° C. for 24 hours.

The resultant electrolyte slurry is coated on a smooth surface of a teflon plate by using a doctor blade, and is dried in a dried argon atmosphere kept at 130° C. for one hour, and is further dried in vacuum for another 5 hours to yield a sheet-formed lithium-ion conductive solid electrolyte molded product (K1) having a thickness of 20 μm and an area of 80×80 mm$^2$.

EXAMPLE 12

A polyether compound, of which the molecular weight is 65,000 and which is obtained by adding EO to triethylene-tetraamine is dissolved in propylene carbonate to obtain a 10% polyether solution (L); LiClO$_4$, as an ionic material, is further dissolved in an amount to produce a 10% solution thereof.

Then, montmorillorite powder with 15 μm average particle size, is added to said solution (L) in an amount to produce a solid content of 20%. This combination of materials is mixed at 40° C. for 24 hours.

The resultant electrolyte slurry is coated on a 330 mesh polyester mesh with 40% opening area and the coated mesh is placed on a smooth surface of a teflon plate, dried in a dried argon atmosphere kept at 130° C. for one hour, and further dried in vacuum for another 5 hours, to yield a sheet-formed lithium-ion conductive solid electrolyte mold (L1) having a thickness of 115 μm and an area of 80×80 mm$^2$.

EXAMPLE 13

A polyether compound, with 15,000 molecular weight, and which is obtained by adding EO and PO (at an EO/PO ration of 40/60) to hexamethylenetetraamine is dissolved in ion-exchanged water to obtain a 10% polyether solution (M); to this solution LiClO$_4$, as an ionic material, is further dissolved in an amount to produce a 20% solution thereof.

Then, γ-zirconium phosphate powder with 25 μm average particle size is added to said solution (M) in an amount to produce a solid content of 20%. This combination of materials is mixed at 40° C. for 24 hours.

The resultant electrolyte slurry is coated on a 330 mesh polyester mesh having a thickness of 85 μm and 40% opening area and the coated mesh is placed on a smooth surface of a silicone resin plate, dried at 80° C. for one hour, and further dried in air for another 24 hours, to yield a sheet-formed solid electrolyte mold (M1) having a thickness of 100 μm and an area of 80×80 mm². In this molded product (M1), the ions which contribute to conduction are probably both aluminum ion and proton.

EXAMPLE 14

A polyether compound, whose molecular weight is 240,000, and which is obtained by adding PO to dipropylene-tetraamine, is dissolved in ion-exchanged water to obtain a 10% polyether solution (N); to this solution $AlCl_3$, as an ionic material, is further dissolved in an amount to produce a 20% solution thereof.

Then, montmorillorite powder, of which the average particle size is 15 μm, is added to said solution (N) in an amount to produce a solid content of 20%. This combination of materials is mixed at 40° C. for 24 hours.

The resultant electrolyte slurry is coated on a 330 mesh polyester mesh having a thickness of 85 μm and 40% opening area and the coated mesh is placed on a smooth surface of a silicone resin plate, dried at 80° C. for one hour, and further dried in air for another 24 hours to yield a sheet-formed solid electrolyte mold (N1) having a thickness of 105 μm and an area of 80×80 mm². In this molded product, the ions which contribute to conduction are probably both the aluminum ion and the proton.

EXAMPLE 15

An inorganic solid electrolyte, Li-β-$Al_2O_3$ powder, whose average particle size is 5 μm, is added to a slurry obtained by using the same process described in Example 11 in amount of 20% of the slurry.

The resultant electrolyte slurry is coated on a smooth surface of a teflon plate by using a doctor blade, and is dried in a dried argon atmosphere kept at 80° C. for one hour, and is further dried in vacuum for another 5 hours to yield a sheet-formed lithium-ion conductive solid electrolyte mold (O1) having a thickness of 35 μm and an area of 80×80 mm².

EXAMPLE 16

A polyether compound whose molecular weight is 180,000 and which is obtained by adding EO and BO (in an EO/BO ratio of 30/70) to polyethyleneimine having 10 nitrogen atoms per molecule is dissolved in acetonitrile to obtain a 20% polyether solution (P); to this solution $LiCF_3SO_3$, as an ionic material, is further dissolved in an amount of 10% of the solution.

Then, γ-zirconium phosphate powder, of which the average particle size is 25 μm, is added to said solution (P) in an amount to produce a solid content of 30%. This combination of materials is mixed at 40° C. for 24 hours.

The resultant electrolyte slurry is coated on a smooth surface of a teflon plate by using a doctor blade, and is dried in an dried argon atmosphere heated at 130° C. for one hour, and is further dried in vacuum for another 5 hours to yield a lithium-ion conductive solid electrolyte sheet (P1) having a thickness of 100 μm and an area of 80×80 mm².

EXAMPLE 17

A polyether compound whose molecular weight is 8,000 and which is obtained by adding EO and BO (at an EO/BO ratio of 80/20) to triethylene tetraamine is dissolved in propylene carbonate to obtain a 10% polyether solution (Q); to this solution $LiClO_4$, as an ionic material, is further dissolved an amount of 10% of the solution.

Then, montmorillorite powder whose average particle size is 15 μm, is added to said solution (Q) in an amount to produce a solid content of 20%. This combination of materials is mixed at 40° C. for 24 hours.

The resultant electrolyte slurry is coated on a 330 mesh polyester mesh having a thickness of 85 μm and an opening area of 40%, the coated mesh is placed on a smooth surface of a silicone resin plate, and is dried in an argon atmosphere heated at 130° C. for one hour, and further dried in vacuum for another 5 hours to yield a lithium-ion conductive solid electrolyte sheet (Q1) having a thickness of 110 μm and an area of 80×80 mm².

EXAMPLE 18

A polyether compound whose molecular weight is 15,000 which is obtained by adding EO and BO (EO/BO ratio of 60/40) to hexamethylene tetraamine is dissolved in ion-exchanged water to obtain a 10% polyether solution (R); to this solution, then, γ-zirconium phosphate powder, of which the average particle size is 25 μm, is added in an amount to produce a solid content of 20%. This combination of materials is mixed at 40° C. for 24 hours.

The resultant electrolyte slurry is coated on a 330 mesh polyester mesh having a thickness of 85 μm and an opening area of 40% and the coated mesh is placed on a smooth surface of a silicone resin plate, dried in air heated at 80° C. for one hour, and further dried in air for another 24 hours to yield a solid electrolyte sheet (R1) having a thickness of 100 μm and an area of 80×80 mm². In this molded sheet, the ions which contribute to conduction are probably both aluminum ion and proton.

EXAMPLE 19

A polyether compound whose molecular weight is 250,000 and which is obtained by adding EO and BO (EO/BO ratio of 80/20) to hexamethylene tetraamine is dissolved in ion-exchanged water to obtain a 10% polyether solution (S).

Then, montmorillorite powder, whose average particle size is 15 μm, is added to said polyether solution (S) in an amount to produce a solid content of 20%. This combination of materials is mixed at 40° C. for 24 hours.

The resultant electrolyte slurry is coated on a 330 mesh polyester mesh having a thickness of 85 μm and an opening area of 40% and the coated mesh placed on a smooth surface of a silicone resin plate, dried at 80° C. for one hour, and further dried in air for another 24 hours to yield a sheet-formed solid electrolyte mold (S1) having a thickness of 100 μm and an area of 80×80 mm². In this molded product (S1), the ions which contribute to conduction are probably both aluminum ion and proton.

EXAMPLE 20

An inorganic solid electrolyte, Li-β-$Al_2O_3$ powder, whose average particle size is 5 μm, is added to a slurry obtained by using the same process described in Example 16. The amount of powder added is 20% of the slurry.

The resultant electrolyte slurry is coated on a smooth surface of a teflon plate by using a doctor blade, and is dried in a dried argon atmosphere kept at 80° C. for one hour, and is further dried in vacuum for another 5 hours to yield a sheet-formed lithium-ion conductive solid electrolyte mold (T1) having a thickness of 55 μm and an area of 80×80 mm².

CONDUCTIVITY OF SOLID FORM ELECTROLYTE COMPOSITE MOLDS

The solid electrolyte molded products described in Examples 1 to 20 are each punched out into ten disks having a diameter of 10 mm. Each of these disks is sandwiched between two platinum plates, and a pressure of 50 kg/cm$^2$ is applied on the platinum plates in order to measure the AC resistance of the disk at 20° C. by applying a 10 kHz AC signal. The measured electric conductivities are tabulated in Table 1.

EFFECT OF THE INVENTION

As proved by the above shown Examples, solid form electrolytes of uniform and high ionic conductivities can be obtained by employing the compositions of solid electrolyte of the present invention.

Such solid form electrolytes can be effectively utilized as a solid electrolyte for a lithium cell of which the negative electrode can be metallic lithium, lithium alloy, or a lithium compound, or it can be an electrolyte for a primary or secondary cell of which the negative electrode can be zinc, aluminum, or hydrogen-storage alloy.

What is claimed:

1. A solid form electrolyte comprising: from 1 to 50 percent by weight of an ion-exchanging layered compound, from 1 to 50 percent by weight of an ionic material expressed by MX where M is a mono-, di- or tri-valent metallic ion, proton, or ammonium ion which moves in the solid form electrolyte under an applied electric field and X is an anion of strong acid, and at least one compound selected from the group consisting of:

(a) from 0.5 to 20 percent by weight of a cationic surface active agent containing polyalkylene-oxide chains selected from the group consisting of 20 to 500 ethylene-oxide, propylene-oxide units and mixtures thereof in all per one mole of said cationic surface active agent, (b) from 0.5 to 20 percent by weight of a cationic surface active agent containing polyalkylene-oxide chains consisting of 20 to 500 ethylene-oxide and a butylene-oxide units in all per one mole of said cationic surface active agent, (c) from 1 to 20 percent by weight of a polyether compound obtained by adding an alkylene oxide selected from the group consisting of ethylene-oxide, propylene-oxide and mixtures thereof to polyamine compound in an amount of 2 to 150 of ethylene-oxide, propylene-oxide and mixtures thereof per one active hydrogen of the polyamine compound, and (d) from 1 to 20 percent by weight of a polyether compound obtained by adding ethylene-oxide and butylene-oxide to polyamine compound in an amount of 2 to 150 of ethylene-oxide and butylene-oxide units in all per one active hydrogen of the polyamine compound.

2. A solid form electrolyte according to claim 1 wherein the ionic material MX is selected from the group consisting of LiI, LiClO$_4$, LiCF$_3$SO$_3$, LiBF$_6$, LiSCN, LiAsF$_6$, NaI, NaSCN, NaBr, KI, AgNO$_3$, CuCl$_2$, Mg(ClO$_4$)$_2$ and AlCl$_3$.

3. A solid form electrolyte according to claim 1 wherein the ion-exchanging layered compound is selected from the group consisting of montmorillonite, hectolite, saponite, smectite, gamma-zirconium phosphate, titanium phosphate, vanadic acid, antimonic acid and tungstic acid.

4. A solid from electrolyte according to claim 1 wherein said polyamine compound is selected from the group consisting of polyethyleneimine, triethylenetetramine, hexamethylenetetramine and dipropylenetetramine.

* * * * *